United States Patent
Bajpai et al.

(10) Patent No.: US 9,126,128 B2
(45) Date of Patent: Sep. 8, 2015

(54) DEVICE INCLUDING CARBON NANOTUBE MATERIAL FOR SEPARATING A LIQUID EMULSION OF AN ORGANIC LIQUID AND WATER

(75) Inventors: Vardhan Bajpai, Lebanon, NJ (US); Christopher H. Cooper, Windsor, VT (US)

(73) Assignee: Seldon Technologies, Inc., Windsor, VT (US)

(*) Notice: Subject to any disclaimer, the term of this patent is extended or adjusted under 35 U.S.C. 154(b) by 219 days.

(21) Appl. No.: 12/615,819

(22) Filed: Nov. 10, 2009

(65) Prior Publication Data

US 2010/0116751 A1    May 13, 2010

Related U.S. Application Data

(60) Provisional application No. 61/113,386, filed on Nov. 11, 2008.

(51) Int. Cl.
| | | |
|---|---|---|
| *B01D 17/022* | (2006.01) | |
| *B01D 39/00* | (2006.01) | |
| *B01D 17/04* | (2006.01) | |

(52) U.S. Cl.
CPC .................................. *B01D 17/045* (2013.01)

(58) Field of Classification Search
CPC .............................. B01D 17/045; B01D 17/10
USPC ......... 210/505, 508, 509, DIG. 5, 312, 433.1, 210/504
See application file for complete search history.

(56) References Cited

U.S. PATENT DOCUMENTS

| | | | | |
|---|---|---|---|---|
| 2,739,713 | A * | 3/1956 | Robinson | 210/338 |
| 3,997,303 | A * | 12/1976 | Newton | 95/284 |
| 7,419,601 | B2 | 9/2008 | Cooper et al. | |
| 2001/0025816 | A1* | 10/2001 | Ochi | 210/436 |
| 2004/0007528 | A1 | 1/2004 | Bakajin et al. | |
| 2004/0173506 | A1 | 9/2004 | Doktycz et al. | |
| 2005/0067346 | A1 | 3/2005 | Noack et al. | |
| 2007/0051240 | A1 | 3/2007 | Lin | |
| 2008/0053922 | A1 | 3/2008 | Honsinger, Jr. et al. | |
| 2009/0050578 | A1* | 2/2009 | Israel et al. | 210/767 |
| 2010/0098877 | A1* | 4/2010 | Cooper et al. | 427/551 |
| 2010/0314333 | A1* | 12/2010 | Witsch et al. | 210/767 |

FOREIGN PATENT DOCUMENTS

WO    WO 2008-057070 A2    5/2008

OTHER PUBLICATIONS

International Search Report from PCT/US2009/063908.

* cited by examiner

*Primary Examiner* — Matthew O Savage
(74) *Attorney, Agent, or Firm* — McCarter & English, LLP; Jonathan M. Sparks

(57) ABSTRACT

There is disclosed a material for separating a liquid from a mixture of at least two liquids, for example, for separating water from fuel. In one embodiment, the material comprises a fibrous substrate and carbon nanotubes, both of which have at least one functional group attached thereto. There is also disclosed a method for separating one liquid from another liquid using the disclosed material. In one embodiment, the method comprises flowing a mixture of liquids through the disclosed material, and either coalescing or separating at least one liquid by use of the carbon nanotubes.

16 Claims, 4 Drawing Sheets

DEVICE INCLUDING CARBON NANOTUBE MATERIAL FOR SEPARATING A LIQUID EMULSION OF AN ORGANIC LIQUID AND WATER

This application claims the benefit of domestic priority to U.S. Provisional Patent Application No. 61/113,386, filed Nov. 11, 2008, which is herein incorporated by reference in its entirety.

The present disclosure relates to a material, such as a carbon nanotube containing media, for separating at least one liquid from another liquid, for example, for separating water from fuel. The present disclosure is also related to a method for separating one liquid from another liquid using the disclosed material.

Separation of water from fuels such as ultra-low sulfur diesel fuel (ULSD), biodiesel and their blends is a concern because these fuels form highly stable emulsions with water. The higher water-fuel emulsion stabilities and/or hygroscopic nature of such fuels make the problem of water separation from these fuels difficult. Commercial filters made from micro-glass fiber performs poorly with these fuels and fails to give consistent results with fuels obtained from different commercial sources. Also, conventional distillation columns do not solve the problem completely because they are costly, cannot be installed at every gas station and are not made for mobile applications. A major impediment to making an effective fuel-water separation media is the lack of a small-diameter, high-surface area, highly-stable-in-fuel (no swelling), conducting, chemically modifiable, and strong fibrous material.

One technical difficulty with ULSD is associated with the process of stripping sulfur (hydrodesulfurization) from diesel fuel, which reduces the lubricity of the resulting ULSD. However, achieving a certain lubricity value is important for reducing the wear and abrasion in the engine and its parts. As a result, lubricity additives are typically used to increase lubricity to a standard value. As lubricity additive molecules have both hydrophilic and hydrophobic components, they tend to act as surfactants. The higher the content of lubricity additive in ULSD, the higher the emulsion stabilities and the harder it is to separate water from it.

There is also a need for a material to remove water from biodiesel and biodiesel related products since the hygroscopic nature of biodiesel and its blends makes it difficult to remove water from it. In addition to the foregoing, there is a more general need for an inexpensive and efficient material for separating one or more fluids from a mixture of fluids, or for the separation of a fluid from an emulsion.

SUMMARY OF THE INVENTION

In view of the foregoing, there is disclosed a material comprising carbon nanotubes for separating one liquid from a mixture of liquids. In one embodiment, there is disclosed a material for removing at least one liquid from a mixture of at least two liquids, the material comprising:
  a substrate material, such as a fibrous substrate; and
  carbon nanotubes, wherein both the substrate material and the carbon nanotubes have at least one functional group attached thereto.

In one embodiment there is disclosed a material for separating at least one liquid from a mixture of at least two liquids, the material comprising:
  a glass fiber substrate having at least one silane functional group attached thereto; and
  carbon nanotubes having at least one silane functional group attached thereto, wherein the material comprises said carbon nanotubes in an amount ranging from 0.1-10 wt %.

There is also disclosed a method for separating at least one liquid from a mixture of liquids comprising using the material described herein. For example, the method may comprise flowing a mixture of liquids through a material comprising:
  a substrate material, such as a fibrous substrate; and
  carbon nanotubes, wherein both the substrate material and the carbon nanotubes have at least one functional group attached thereto.

In one embodiment, the method comprises separating a liquid from a hydrocarbon liquid, such as separating water from fuel. In this embodiment, the method comprises flowing a hydrocarbon liquid through the disclosed material to coalesce a liquid on at least the carbon nanotubes, and subsequently removing the coalesced liquid from the hydrocarbon liquid.

DETAILED DESCRIPTION OF THE INVENTION

Definitions

Figure 1:
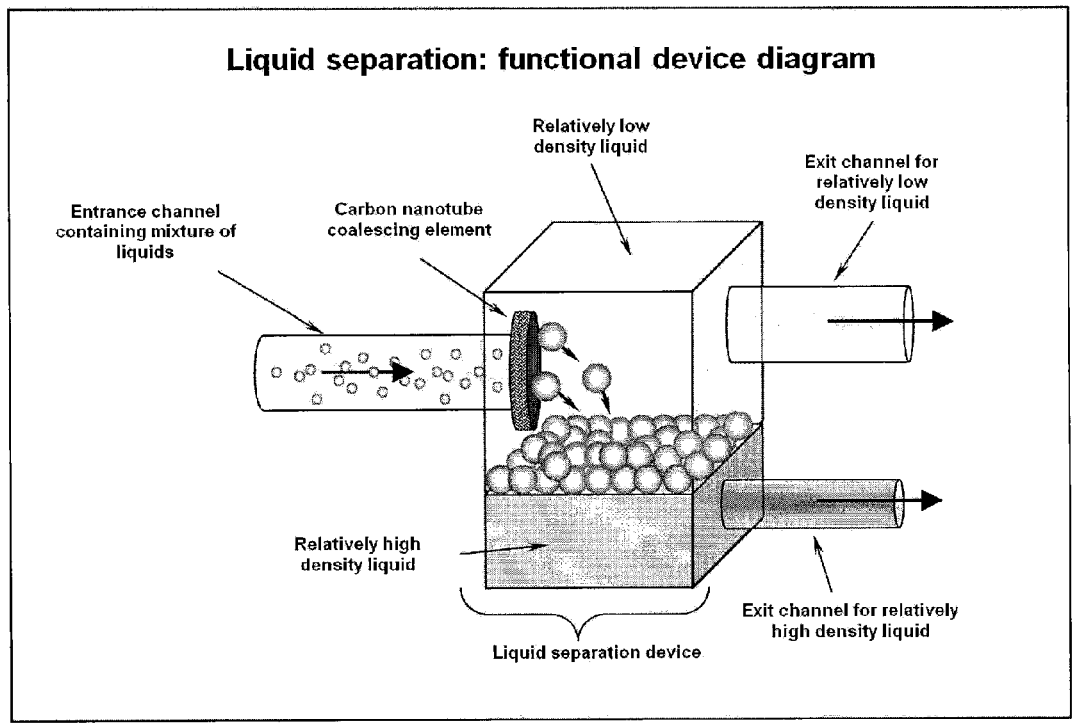
FIG. 1 is a schematic demonstrating the mechanism of coalescing one liquid from a mixture of liquids.

The term "carbon nanotubes" are defined herein as crystalline structures comprised of one or many closed concentric, locally cylindrical, graphene layers. Their structure and many of their properties are described in detail in *Carbon Nanotubes: Synthesis, Structure, Properties, and Applications, Topics in Applied Physics*, (Vol. 80. 2000, Springer-Verlag, M. S. Dresselhaus, G. Dresselhaus, and P. Avouris, eds.), which is herein incorporated by reference. Carbon nanotubes have demonstrated very high mechanical strengths and stiffness (Collins and Avouris, 2000, "Nanotubes for Electronics," *Scientific American:* 67, 68, and 69.) They also have very high electrical conductivity which allows current densities of more than 1,000 times that in metals, such as silver and copper. These properties, in particular the high specific strength and stiffness, will be beneficial to the materials disclosed herein.

The term "ultralong carbon nanotube" is a carbon nanotube having a length of at least 100 microns.

The term "functional group" is defined as any atom, molecule, cluster, or chemical group that provides a specific behavior. The term "functionalized" is defined as adding via bonding a functional group(s) to the surface of the nanotubes and/or the substrate that may alter the properties of the nanotube and or substrate, such as zeta potential.

The term "coalescer" or "coalescing" element is a material used to separate components of an emulsion. A coalescing element, which may comprise fibers and particles in addition to carbon nanotubes, works as reversed emulsifier by bringing smaller droplets of liquid and combining them to form a bigger droplet. The phenomenon of coalescence happens in the presence of an appropriate surface. Without being bound by theory, the mechanism, through which the coalescing element works is dependent on the surface chemistry on the surface which collects smaller droplets, combines them and then disassociates with the droplets when they grow bigger.

The term "separator element" is a media used to separate components of an emulsion. A separator element, which may comprise fibers and particles in addition to carbon nanotubes, works as a barrier, providing very high resistance, for one liquid component in the emulsion while at the same time provides a very low resistance to another component to let it pass through. Similar to a coalescer element, a separator element also requires appropriate surface chemistry to let this happen.

The term "ultralow sulfur diesel" refers to a diesel with sulfur content of 15 ppm or less.

The phrase "mixture of liquids" refers to the set of at least two immiscible or partially miscible liquids.

The term "interfacial tension" refers to the surface free energy that exists between two immiscible liquid phases, such as oil and water. This is in contrast to surface tension, which is the term for the energy barrier between a liquid and air. The energy barrier produced by such interfacial tension prevents one liquid from becoming emulsified into the other.

The term "emulsified" refers to a state of the mixture of liquids where one or more liquid phases are completely or partially broken down into fine droplets through mechanical agitation or application of heat energy. To create a stable emulsified state of liquid mixture the surface free energy must be lowered by the presence of an emulsifier that seeks the interface. The emulsifier could be externally added or be naturally present in the liquids. Spontaneous emulsification does not typically occur just by adding an emulsifier. Lower interfacial tension requires less external energy to form a stable emulsion.

There is provided in one aspect of the present disclosure an article for separation of a liquid from a mixture of at least two liquids wherein the article comprises a coalescing element containing at least one carbon nanotube. For example, not to be bound by theory, a stable emulation of water and fuel can be formed when polar molecules are present in the mixture and self assemble around micro to nano droplets of water. These self assembled structures are called micelles. The polar molecules may comprise additives or surfactants. Also a fraction of the fuel may be comprised of natural polar molecules that also self assemble with water to form micelles. It is believed that carbon nanotubes disrupt the micelle structure thereby releasing the water to coalesce into larger droplets of water.

The inventive article performs with the condition that the liquids in question come in contact with the carbon nanotube, which may or may not be treated.

In one embodiment, the carbon nanotubes described herein are treated to alter their properties, as well as the fluids that may be treated and/or separated. For example, in one embodiment, the carbon nanotubes are chemically treated with an oxidizer, chosen from but not limited to a gas containing oxygen, nitric acid, sulfuric acid, hydrogen peroxide, potassium permanganate, and combinations thereof. Nanotubes which have been treated with an oxidizer can provide unique properties, either in terms of fluid flow, dispersion of nanotubes in the deposition fluid, or from a functionalization perspective, such as having the ability to be particularly functionalized.

Functionalization is generally performed by modifying the surface of substrate or carbon nanotubes using chemical techniques, including wet chemistry or vapor, gas or plasma chemistry, and microwave assisted chemical techniques, and utilizing surface chemistry to bond materials, as opposed to merely adsorbing onto the surface of the substrate and/or carbon nanotubes. Thus, unlike adsorption, functionalization leads to a bond, such as a covalent bond, between the functional groups (such as a molecule or cluster) and the substrate and/or carbon nanotubes. Accordingly, the methods described above are used to "activate" the carbon nanotube, which is defined as breaking at least one C—C or C-heteroatom bond, thereby providing a surface for attaching a molecule or cluster thereto. In one embodiment, functionalized carbon nanotubes comprise chemical groups, such as carboxyl groups, attached to the surface, such as the outer sidewalls, of the carbon nanotube. Further, the nanotube functionalization can occur through a multi-step procedure where functional groups are sequentially added to the nanotube to arrive at a specific, desired functionalized nanotube.

The functionalized carbon nanotubes can comprise a non-uniform composition and/or density of functional groups including the type or species of functional groups across the surface of the carbon nanotubes. Similarly, the functionalized carbon nanotubes can comprise a substantially uniform gradient of functional groups across the surface of the carbon nanotubes. For example, there may exist, either down the length of one nanotube or within a collection of nanotubes, many different functional group types (i.e. hydroxyl, carboxyl, amide, amine, poly-amine, silane, and/or other chemical functional groups) and/or functionalization densities.

Further, other components of the material, such as fibers and/or nanoparticles, may also be functionalized with chemical groups, decorations or coatings or combinations thereof to change their zeta potential and/or cross-linking abilities and thereby improve the separation performance of the material.

The carbon nanotubes may be found in the disclosed material in an amount ranging from 0.1 to 25 wt. %, such as from 0.5 to 20 wt. % or even 1 to 10 wt % of the material. It is noted that the end points of these ranges may be interchanged, for example the amount of carbon nanotubes may range from 0.1 to 20 wt %, 0.5 to 10 wt % of the material or any combination thereof.

Fibers that can be Included in the Material

The material described herein may also comprise fibers which act to maintain the dispersion (or exfoliation) of the carbon nanotubes during processing, and/or which may add mechanical integrity to the final product. Such fibers can be sacrificial (removed from the structure during further processing, such as by chemical or heat treatments) or can remain an integral part of the finished device. As used herein, the term "fiber" means an object of length L and diameter D such that L is greater than D, wherein D is the diameter of the circle in which the cross section of the fiber is inscribed. For example, the aspect ratio L/D (or shape factor) is chosen ranging, for example, from 2 to $10^9$, such as from 5 to $10^7$ and further such as from 5 to $10^6$. Typically these fibers have a diameter ranging from 1 nm to 1 mm, such as from 10 nm to 100 µm.

The fibers that may be used in the composition disclosed herein may be mineral or organic fibers of synthetic or natural origin. They may be short or long, individual or organized, for example, braided, and hollow or solid. They may have any shape, and may, for example, have a circular or polygonal (square, hexagonal or octagonal) cross section, depending on the intended specific application.

The fibers have a length ranging, for example, from 10 nm to 10 m, such as from 20 nm to 1 cm. Their cross section may be within a circle of diameter ranging, for example, from 1 nm to 1 mm.

The fibers can be those used in the manufacture of textiles as derived from bio-mineralization or bio-polymerization, such as silk fiber, cotton fiber, wool fiber, flax fiber, feather fibers, cellulose fiber extracted, for example, from wood, legumes or algae.

Depending on the fluids to be separated, medical fibers may also be used in the present disclosure. For instance, the resorbable synthetic fibers may include: those prepared from glycolic acid and caprolactone; resorbable synthetic fibers of the type which is a copolymer of lactic acid and of glycolic acid; and polyterephthalic ester fibers. Nonresorbable fibers such as stainless steel threads may be used.

The Fibers May be Chosen from:

(a) at least one polymeric material chosen from single or multi-component polymers such as nylon, acrylic, methacrylic, epoxy, silicone rubbers, synthetic rubbers, polypropylene, polyethylene, polyurethane, polystyrene, polycarbonates, aramids (i.e. Kevlar® and Nomex®), polychloroprene, polybutylene terephthalate, poly-paraphylene terephtalamide, poly (p-phenylene terephtalamide), and polyester ester ketone, polyesters [e.g. poly(ethylene terephthalate), such as Dacron®], polytetrafluoroethylene (i.e. Teflon®), polyvinylchloride, polyvinyl acetate, viton fluoroelastomer, polymethyl methacrylate (i.e. Plexiglass®), and polyacrylonitrile (i.e. Orlon®), and combinations thereof;

(b) at least one ceramic material chosen from boron carbide, boron nitride, spinel, garnet, lanthanum fluoride, calcium fluoride, silicon carbide, carbon and its allotropes, silicon oxide, glass, quartz, silicon nitride, alumina, aluminum nitride, aluminum hydroxide, hafnium boride, thorium oxide, cordierite, mullite, ferrite, sapphire, steatite, titanium carbide, titanium nitride, titanium boride, zirconium carbide, zirconium boride, zirconium nitride, and combinations thereof;

(c) at least one metallic material chosen from aluminum, boron, copper, cobalt, gold, platinum, palladium, silicon, steel, titanium, rhodium, iridium, indium, iron, gallium, germanium, tin, tungsten, niobium, magnesium, manganese, molybdenum, nickel, silver, zirconium, yttrium, their oxides, hydrides, hydroxides and alloys thereof;

(d) at least one biological material or derivative thereof chosen from cotton, cellulose, wool, silk, and feathers, and combinations thereof; and (e) at least one carbon nanotube chosen from single walled, double walled or multi-walled carbon nanotubes that have either a nested or non-nested morphology of nano-horns, nano-spirals, nano-springs, dendrites, trees, spider nanotube structures, nanotube Y-junctions, and bamboo morphology or multi-stranded helices;

(f) at least one metallic oxide or metallic hydroxide nanowire. For example, a metal oxide nanowire can be prepared by heating metal wires with oxygen in a reaction vessel to a temperature ranging from 230-1000° C. for a period ranging from 30 minutes to 2 hours. The nanowires will grow by using macroscale wires made any metal previously mentioned as a feedstock. The resulting metallic oxide nanowires can be in a size ranging from 1-100 nanometers in diameter, such as 1-50 nanometers in diameter, including 2-5 nanometers in diameter. In one advantageous aspect of this process, the surface of the base wire is abraded to provide a roughened surface texture to enable better nanotube adhesion within the nanomesh as well as enhance the purification performance of the article. These metal oxide or metal hydroxide nanowires can also be obtained from commercial suppliers.

In addition to the foregoing list of fibrous material, the material made according to the present disclosure may comprise at least one non-fibrous substrate material, such as particles or beads made of the same materials previous described.

The liquid mixture that the invention can be used to separate may have a non-zero interfacial tension or different densities or both. The separation of those liquids that do not separate due to density difference are expected to be separated using a final separating element which may or may not contain carbon nanotubes.

The liquids in question can be chosen from water, oils, fuels, organic solvents or combinations thereof.

The fuels can be chosen from gasoline, kerosene, aviation fuel, diesel, ultralow sulfur diesel, biodiesel or combinations thereof. Aviation fuel includes but is not limited to an unleaded paraffin oil or a naphtha-kerosene blend. In one embodiment, aviation fuel includes JP-8 ("Jet Propellant 8").

The organic solvents can be chosen from hexane, benzene, toluene, chloroform or combinations thereof.

The invention also includes a method for the separation of one liquid from another liquid, wherein a mixture of liquids is flowed through the material described herein. In one embodiment of this method, one of the liquids coalesces on at least the carbon nanotubes, and is subsequently separated from the other liquid.

In another embodiment of this method, separation of the liquids occurs by preferentially allowing at least one liquid to pass through the material.

EXAMPLES

Example 1

Sample Preparation

Preparation of Carbon Nanotube Suspension 500 mg of carboxylated ultra-long carbon nanotubes and 250 mg Sodium Dodecyl Sulphate (SDS) were added to 3 L of reverse osmosis (RO) water and subsequently mixed in a blender (Greerco®) for 30 min at 6000 rpm.

Preparation of Material (Media) Suspension:

The amount of glass fibers shown in Table 1, were dispersed in RO water and added to the vessel. The volume of the vessel was then raised to 10 L using RO water, and 10 drops of sulfuric acid was then added.

TABLE 1

| Carbon Nanotubes | | Glass Fiber 1 | | Glass Fiber 2 | | Glass Fiber 3 | | Bio-Component Fiber | Total |
|---|---|---|---|---|---|---|---|---|---|
| g | L | g | L | g | L | g | L | g | g |
| 0.5 | 0.5 | 6.0 | 1.2 | 6.0 | 1.2 | 8.0 | 1.6 | 3.5 | 24 |

Glass fiber 1: Average diameter of 0.65 μm
Glass fiber 2: Average diameter of 2.44 μm
Glass fiber 3: Average diameter of 6.0 μm
Bio-component fiber: Polyethylene teraphthalate - Average diameter of 18 μm The carbon nanotube suspension, as previously prepared, was added to an appropriate amount of bi-component fiber suspension shown in Table 1. The combination was then suspended and blended 10 times in 500 mL of RO water The volume of RO water was raised to 18 L and the prepared suspension was blended for 1 hour using a Greerco® blender.

The well mixed suspension was then poured in the head box of large deposition station.

The suspension was then deposited onto a Reemay® (a spunbond polyester media) substrate under vacuum of approximately 5" Hg.

This material was then dried at 70° C. in forced air oven for 40 min. It was further baked at 120° C. in forced air oven for 30 min. Air permeability, conductivity and porosity were measured according to standard protocols.

Material Modification Process to Add Silane Functional Group:

100 drops of styrene ethyl tri-methoxysilane (SETMS) (~4%) were added to 200 ml of ethanol (5% water). The mixture from the previous step was shaken and mixed well for 5 min, and then used to wet the material completely.

A Reemay® sheet was placed in the top of the material and gently pressed by hand to evenly distribute the suspension through out the material.

This sandwiched material stack was heated at 85° C. for 1 hr and then at 125° C. for 15 min for final cross-linking.

Example 2

Water Removal Test 1

Flat sheet material made according to the above example were tested to determine water removal efficiency for CNT water-ULSDF technology, and to compare those efficiencies with samples not containing carbon nanotubes, as well as known cellulose media. Material according to the present invention was provided to Southwest Research Institute (SwRI) for water removal evaluations per SAE J1488 Emulsified Water Removal. In addition to these materials, SwRI used a known cellulose media (Racor® 2020 SM –2 µm) as a standard to verify the flat sheet testing system performed properly.

The SAE J1488 test was modified to allow for the low flow rates required for the flat sheet tests. In addition, a 12-V automotive fuel pump was utilized to transfer the fuel.

The flow rate for the system was 1.1 lpm, which equated to a velocity of approximately 0.053 mL/sec, with a face velocity of 3.2 mL/cm$^2$.

The time weighted average water removal efficiencies are reported in Table 2. Water removal and other relevant parameters for another inventive material are presented in Tables 3 and 4. Evaluations performed on the supplied material are presented for each.

TABLE 2

| Sample No. | Media | Efficiency (%) |
|---|---|---|
| 1 | Racor ® 2020 SM (2 µm) | 99.9 |
| 2 | Racor ® 2020 SM (2 µm) | 99.2 |
| 3 | Comparative 1 - Glass fiber | 83.9 |
| 4 | Comparative 2 - Glass fiber | 69.8 |
| 5 | Inventive 1 - Glass fiber & CNTs | 98.7 |
| 6 | Inventive 2 - Glass fiber & CNTs | 100 |

The dramatic difference in the water removal performance between samples 3 and 4 (glass fibers alone) and 5 and 6 (glass fibers and carbon nanotubes) material show that carbon nanotube containing material can improve liquid removal properties of the material. While not being bound by any theory, it is believed that carbon nanotubes increase the water coalescence performance of a glass fiber media by providing a mesoporous structure to destabilize the very stable water-ULSDF emulsions.

Figure 2:
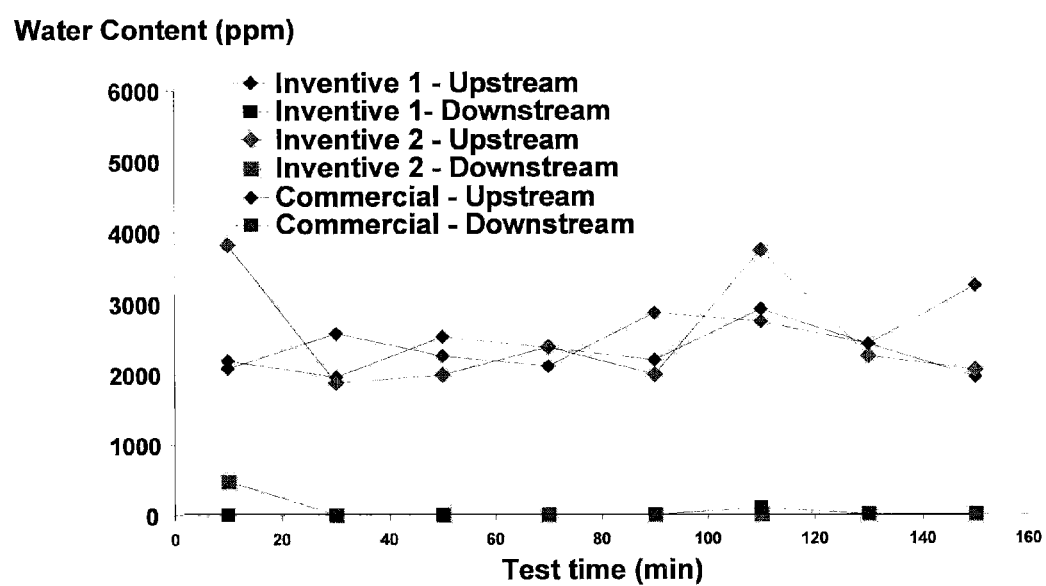
FIG. 2 is a graph of the water content in fuel data at the up and down stream of the test filter material.
Figure 3:
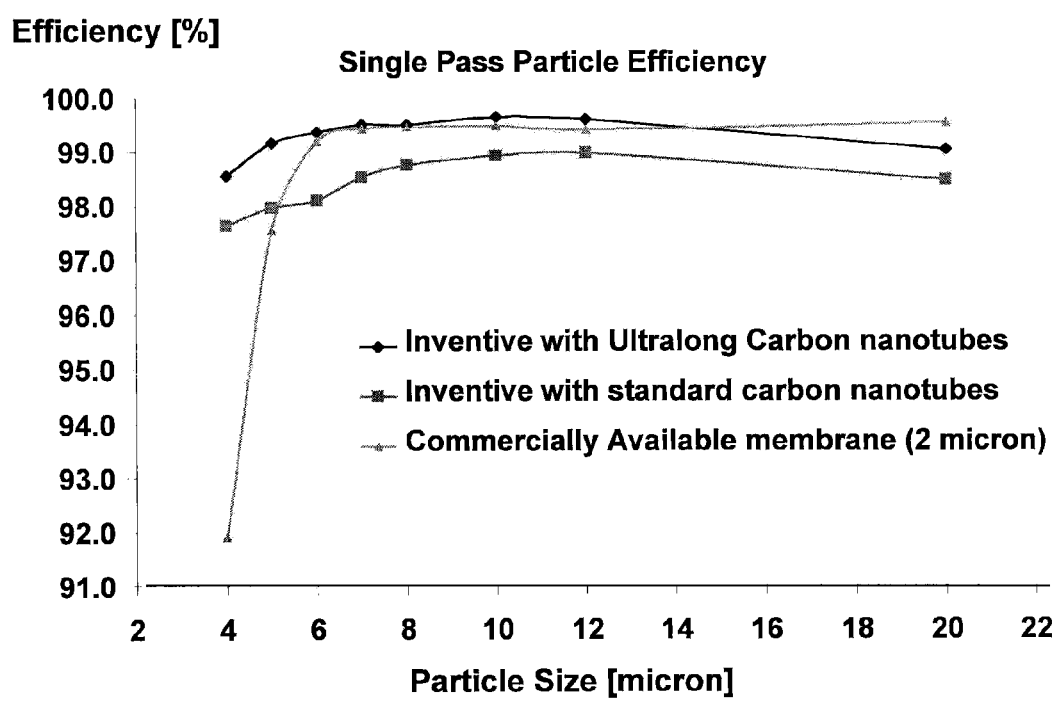
FIG. 3 is a graph comparing efficiencies of filter materials made according to the present invention and the prior art.

The commercially available Racor® media performance is plotted against the performance of inventive material in FIG. 2. In particular, the inlet and outlet water content are of ULSDF is plotted in FIG. 2. It is evident from the plot that the inventive material performs equally to the one of the best commercially available media. However, the pressure drop across the inventive material was 25-30% less than that of the commercially available Racor® material.

TABLE 3

| Sample ID | Test Time (minutes) | Upstream (ppm) | Downstream (ppm) | | Pressure Drop (kPa) |
|---|---|---|---|---|---|
| 1 | 10 | 3830 | 559 | 478 | 1.8 |
| 2 | 30 | 1870 | 59 | 0 | 1.8 |
| 3 | 50 | 1980 | 38 | 0 | 1.8 |
| 4 | 70 | 2380 | 69 | 0 | 1.8 |
| 5 | 90 | 1980 | 21 | 0 | 1.8 |
| 6 | 110 | 3750 | 50 | 0 | 1.8 |
| 7 | 130 | 2240 | 25 | 0 | 1.8 |
| 8 | 150 | 2040 | 75 | 0 | 1.8 |

TABLE 4

| Sample ID | Test Time (minutes) | Upstream (ppm) | Downstream (ppm) | Pressure Drop (kPa) |
|---|---|---|---|---|
| 1 | 10 | 2190 | 32 | 0 | 1.9 |
| 2 | 30 | 1960 | 16 | 0 | 1.9 |
| 3 | 50 | 2530 | 34 | 0 | 1.9 |
| 4 | 70 | 2360 | 23 | 0 | 1.9 |
| 5 | 90 | 2190 | 31 | 0 | 1.9 |
| 6 | 110 | 2910 | 26 | 0 | 1.9 |
| 7 | 130 | 2410 | 57 | 0 | 1.9 |
| 8 | 150 | 1950 | 24 | 0 | 1.9 |

Example 3

Water Removal Test 2

In another embodiment, a highly stable water-ultralow sulfur diesel (ULSD) fuel micro-emulsion was introduced from one side of the material and the fuel rich stream were collected from the other side. Water content in the fuel rich stream was measured and reported. As shown in Table 5, the average water removal efficiency of both materials was found to be close to 95%. In contrast, commercially available media (from Stanadyne®) exhibits a water removal performance of ranging from 60 to 80%, which dropped drastically upon use. A similar drop in performance was seen with the commercial Racor® membrane used as a control. The water-fuel separation material described herein showed significant improvements in performance as compared to these commercially available media.

TABLE 5

| Sample No. | Time (min) | Influent [PPM] | Effluent [PPM] | Efficiency [%] | Average Efficiency [%] | Flow Rate [GPH] | IFT [Dynes/cm] | Micro-Spectrometer reading |
|---|---|---|---|---|---|---|---|---|
| Control | 5 | 2641.28 | — | — | 73.65 | 20 | 24.6 | 95 |
| | 10 | — | 649.12 | 75.4 | | | | |
| | 15 | 2592.77 | — | — | | | | |
| | 30 | — | 728.64 | 71.9 | | | | |

TABLE 5-continued

| Sample No. | Time (min) | Influent [PPM] | Effluent [PPM] | Efficiency [%] | Average Efficiency [%] | Flow Rate [GPH] | IFT [Dynes/cm] | Micro-Spectrometer reading |
|---|---|---|---|---|---|---|---|---|
| Inventive with carbon nanotubes | 5 | 2278.43 | — | — | 95.45 | 19 | 22.6 | 93 |
| | 10 | — | 113.60 | 95.01 | | | | |
| | 25 | — | 109.27 | 95.20 | | | | |
| | 35 | 2393.40 | — | — | | | | |
| | 45 | — | 93.81 | 96.08 | | | | |
| | 55 | 2419.64 | — | — | | | | |
| | 60 | | 108.95 | 95.50 | | | | |
| Inventive with ultralong carbon nanotubes | 5 | 2172.69 | — | — | 94.24 | 19 | 22.6 | 93 |
| | 10 | — | 228.69 | 89.47 | | | | |
| | 25 | — | 98.23 | 95.48 | | | | |
| | 35 | 2247.34 | — | — | | | | |
| | 45 | — | 91.28 | 95.94 | | | | |
| | 55 | 2416.37 | — | — | | | | |
| | 60 | — | 94.58 | 96.09 | | | | |

The test fluid used in Example 3 was Visor and the test dust used was ISO Medium A.T.D. 12103-1. The test flow rate was about 10.5 LPH through the filter and 1.5 LPH through the laser particle counter. For particles smaller than 6 micron, the commercial filter employed (Stanadyne® 2 micron) underwent a drastic decline in removal efficiencies while filters made with the inventive did not. The inventive material performed at much better water and particle removal efficiencies than commercially available material at relatively same pressure drops.

The membrane performance obtained in Example 3 are comparatively lower than what was obtained in Example 2, primarily for two reasons. First, the face velocities used in Example 2 were almost double than that used in Example 1. Second, the ULSD used Example 2 had a much lower interfacial tension (IFT)-22.6 dyne/cm compared to an IFT of 36.5 dyne/cm for Example 2. The test parameters in Examples 2 and 3 are summarized in Table 6.

TABLE 6

| Example | Membrane Surface Area [cm²] | Face Velocity [ml/min/cm²] | IFT [dynes/cm] | Average Water removal [%] |
|---|---|---|---|---|
| 2 | 344.0 | 3.48 | 36.5 | 99.36 |
| 3 | 184.2 | 6.51 | 22.6 | 94.24 |

As demonstrated in FIG. 1, during the coalescence one liquid from a mixture of liquids the smaller emulsified water droplet coalesce and form bigger droplets when passed through the disclosed material, the bigger droplet of one liquid eventually settle down due to density difference and is separated from the bottom.

Figure 4:
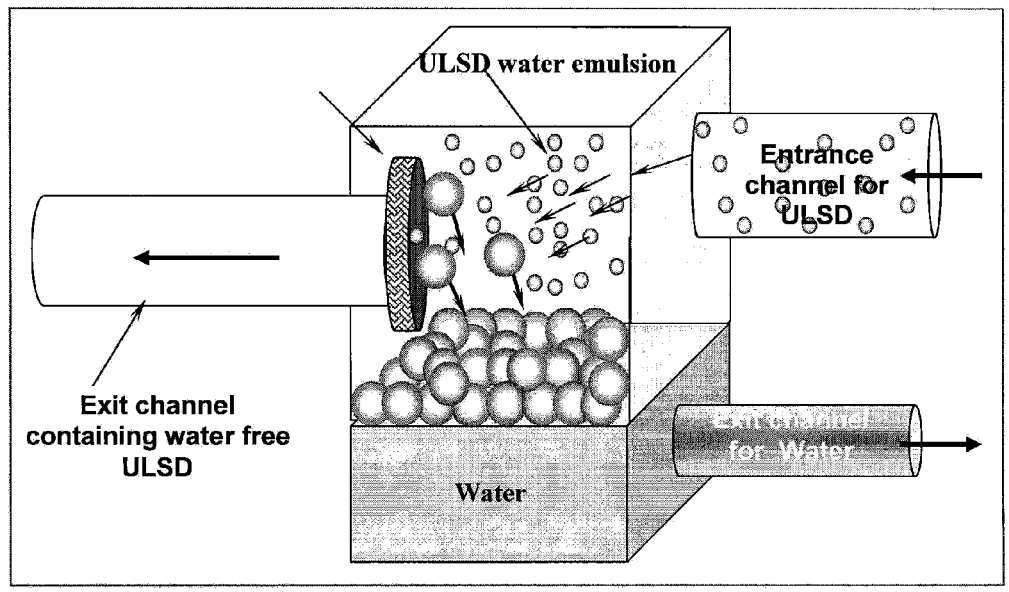
FIG. 4 is a schematic demonstrating the mechanism of separating water from ultra-low sulfur diesel.

As demonstrated in FIG. 4, during the separation of one liquid from a mixture of liquids, the emulsified water-ULSD suspension comes in contact with the material. Due to high hydrophobicity of the material, the tiny droplets get collected on the upstream face of the article and grow bigger in size by coalescing with each other. These droplets fall down when they get of a certain size (due to gravity) and get collected in the drain. This water can be removed time to time from the drain. However, the article poses little resistance to fuel due to its high fuel lyophilicity, water free ULSD can be collected from the downstream side of the article.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for separating a liquid emulsion of an organic liquid and water, said device comprising:
    a supply of said emulsion;
    a container;
    an inlet connected to said supply for introducing said emulsion into the container;
    a material disposed in the container configured to contact and separate the emulsion into an organic liquid phase and a water phase, said material comprising:
        a fibrous substrate; and
        carbon nanotubes, wherein both said fibrous substrate and said carbon nanotubes have at least one functional group attached thereto;
    a first outlet for removing the organic phase from said container separately from the water phase; and
    a second outlet for removing the water phase from the container separately from the organic phase.

2. The device of claim 1, wherein said at least one functional group is chosen from hydroxyl, carboxyl, carboxylate, ether, ester, sulfo, sulfonyl, amide, amine, imine, ammonium, and silane groups, and combinations thereof.

3. The device of claim 1, wherein said material further comprises at least one non-fibrous substrate material.

4. The device of claim 1, wherein said fibrous substrate is selected from a group consisting of a material chosen from mineral, organic, synthetic, and natural origins.

5. The device of claim 1, wherein said fibrous substrate is selected from a group consisting of glass, polymer, or metal fibers, or combinations thereof.

6. The device of claim 1, wherein said fibrous substrate comprises a glass fiber and said functional group comprises silane.

7. The device of claim 1, wherein said organic liquid is selected from a group consisting of oils, fuels, organic solvents or combinations thereof.

8. The device of claim 7, wherein said fuels are comprised of gasoline, kerosene, aviation fuel, diesel, biodiesel, or combinations thereof.

9. The device of claim 7, wherein said organic solvents are comprised of hexane, benzene, toluene, chloroform or combinations thereof.

10. The device of claim 1, wherein said organic liquid has a different density than said water.

11. The device of claim 10, wherein said organic liquid has a lower density than said water.

12. The device of claim 10, wherein said second outlet is located in said device below said first outlet.

13. The device of claim 1, wherein said material comprises carbon nanotubes in an amount ranging from 0.1-20 wt %.

14. A device for separating a liquid emulsion of an organic liquid and water, said device comprising:
- a supply of said emulsion;
- a container;
- an inlet connected to said supply for introducing said emulsion into the container;
- a material disposed in the container configured to contact and separate the mixture into an organic liquid phase and a water phase, said material comprising:
  - a glass fiber substrate having at least one silane functional group attached thereto; and
  - carbon nanotubes having at least one silane functional group attached thereto, wherein said material comprises said carbon nanotubes in an amount ranging from 0.1-20 wt %;
- a first outlet for removing the organic liquid phase from said container separately from the water phase; and
- a second outlet for removing the water phase from the container separately from the organic.

15. A device for separating a liquid emulsion of an organic liquid and water, said device comprising:
- a supply of said emulsion;
- a container;
- an inlet connected to said supply for introducing said emulsion into the container;
- a material disposed in the container configured to contact and separate emulsion into an organic liquid phase and a water phase, said material comprising:
  - a fibrous substrate; and
  - carbon nanotubes, wherein both said fibrous substrate and said carbon nanotubes have at least one functional group attached thereto;
- a first outlet for removing the organic liquid phase from said container separately from the water phase; and
- a second outlet for removing the water phase from the container separately from the organic liquid phase, wherein the material separates the inlet from the two outlets; and
- wherein the organic liquid has a density less than water.

16. A device for separating a liquid emulsion of an organic liquid and water, said device comprising:
- a supply of said emulsion;
- a container;
- an inlet connected to said supply for introducing said emulsion into the container;
- a material disposed in the container configured to contact and separate the emulsion into an organic liquid phase and a water phase, said material comprising:
  - a glass fiber substrate having at least one silane functional group attached thereto; and
  - carbon nanotubes having at least one silane functional group attached thereto, wherein said material comprises said carbon nanotubes in an amount ranging from 0.1-20 wt %;
- a first outlet for removing the organic phase from said container separately from the water phase; and
- a second outlet for removing the the water phase from the container separately from the organic liquid phase, wherein the material separates the inlet from the two outlets; and wherein the organic liquid has a density less than water.

* * * * *